US007402248B2

(12) United States Patent  
Cuenca et al.

(10) Patent No.: US 7,402,248 B2
(45) Date of Patent: Jul. 22, 2008

(54) ACTIVE BIOLOGICAL CONTACTOR (ABC); A MODULAR WASTEWATER TREATMENT SYSTEM

(76) Inventors: Manuel Alvarez Cuenca, 30 Greenfield Avenue, Suite 906, Toronto, Ontario (CA) M2N 6N3; José Manuel Alvarez, 175 W. 12th St., Suite 8k, Manhattan, New York, NY (US) 10011

( * ) Notice: Subject to any disclaimer, the term of this patent is extended or adjusted under 35 U.S.C. 154(b) by 183 days.

(21) Appl. No.: 11/423,215

(22) Filed: Jun. 9, 2006

(65) Prior Publication Data

US 2007/0023356 A1 Feb. 1, 2007

Related U.S. Application Data

(60) Provisional application No. 60/688,713, filed on Jun. 9, 2005.

(51) Int. Cl.
*C02F 3/08* (2006.01)
*C02F 3/20* (2006.01)
(52) U.S. Cl. .................. 210/619; 210/620; 210/151; 210/220; 210/260
(58) Field of Classification Search ............... 210/150, 210/151, 202, 220, 257, 260, 619, 620, 631
See application file for complete search history.

(56) References Cited

U.S. PATENT DOCUMENTS

| 3,817,857 | A | * | 6/1974 | Torpey | 210/619 |
| 3,827,559 | A | * | 8/1974 | Gass et al. | 210/150 |
| 3,849,303 | A | * | 11/1974 | Torpey | 210/619 |
| 4,345,997 | A | * | 8/1982 | McConnell et al. | 210/150 |
| 4,668,387 | A | * | 5/1987 | Davie et al. | 210/150 |
| 5,425,874 | A | * | 6/1995 | Gass | 210/150 |
| 6,830,690 | B2 | * | 12/2004 | Schmid | 210/151 |
| 6,949,191 | B1 | * | 9/2005 | Petrone | 210/619 |

* cited by examiner

*Primary Examiner*—Christopher Upton
(74) *Attorney, Agent, or Firm*—Ryan W. Dupuis; Michael R. Williams; Adrian D. Battison

(57) ABSTRACT

A method and system for wastewater treatment includes flowing a quantity of a wastewater into a first microbubble chamber having a plurality of diffusers for injecting microbubbles into the wastewater to promote oxygenation. The microbubble includes activated sludge for treating the wastewater. The wastewater is then flowed from the first microbubble chamber through a plurality of rotating discs having a biofilm of microorganisms mounted thereon. The discs rotate about a shaft such that a portion of each disc is exposed to air during rotation. The wastewater is the flowed into a second microbubble chamber having a plurality of diffusers for injecting microbubbles into the wastewater. The treated wastewater is then recovered.

12 Claims, 14 Drawing Sheets

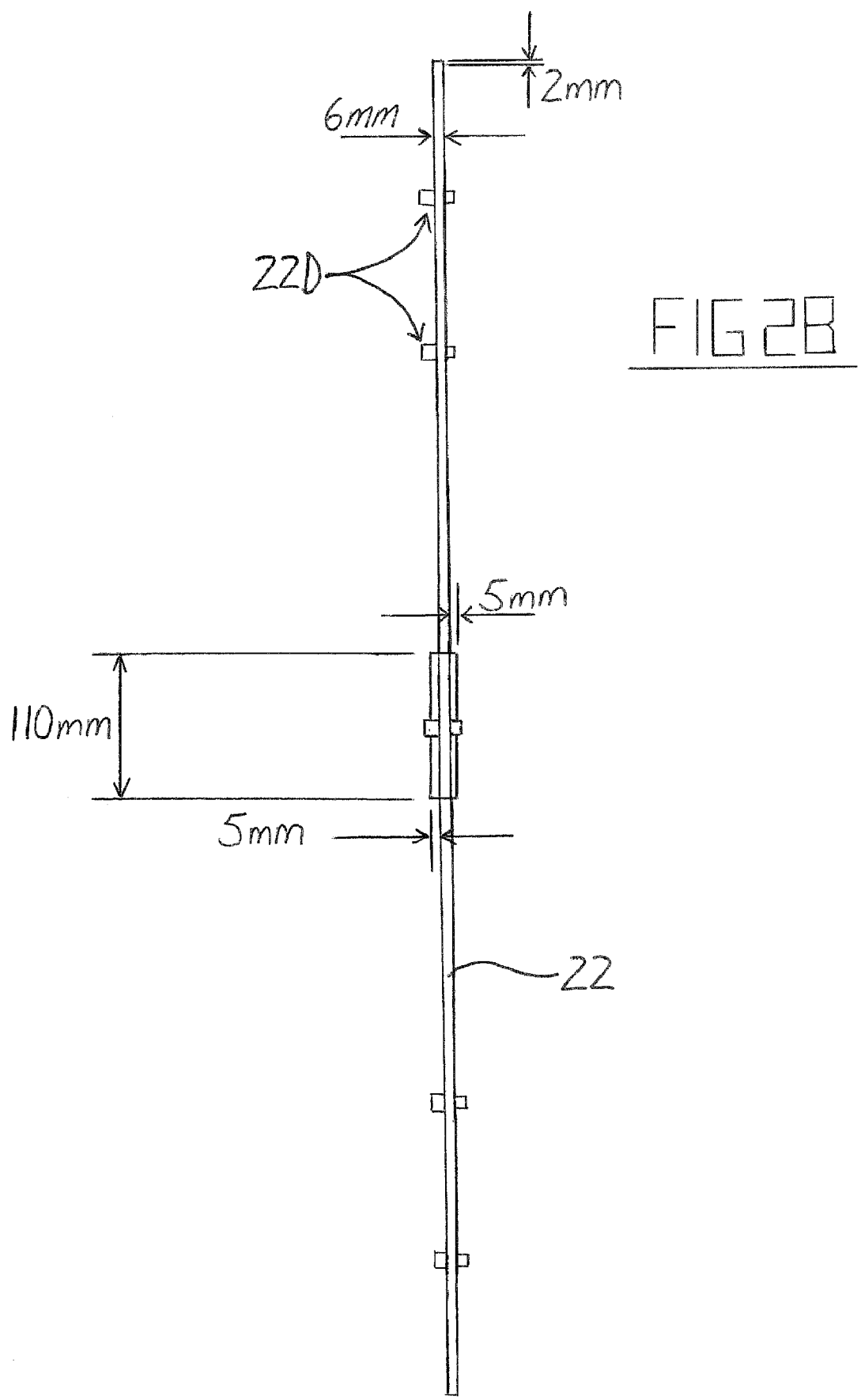

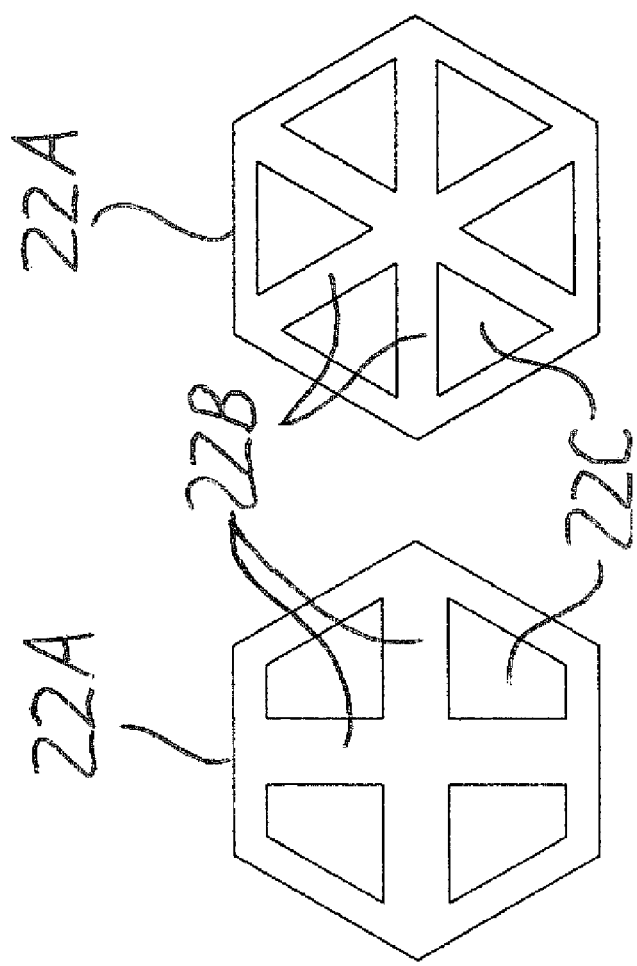
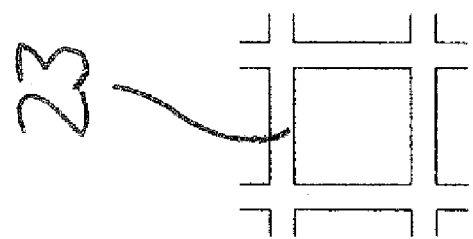
FIG. 2C

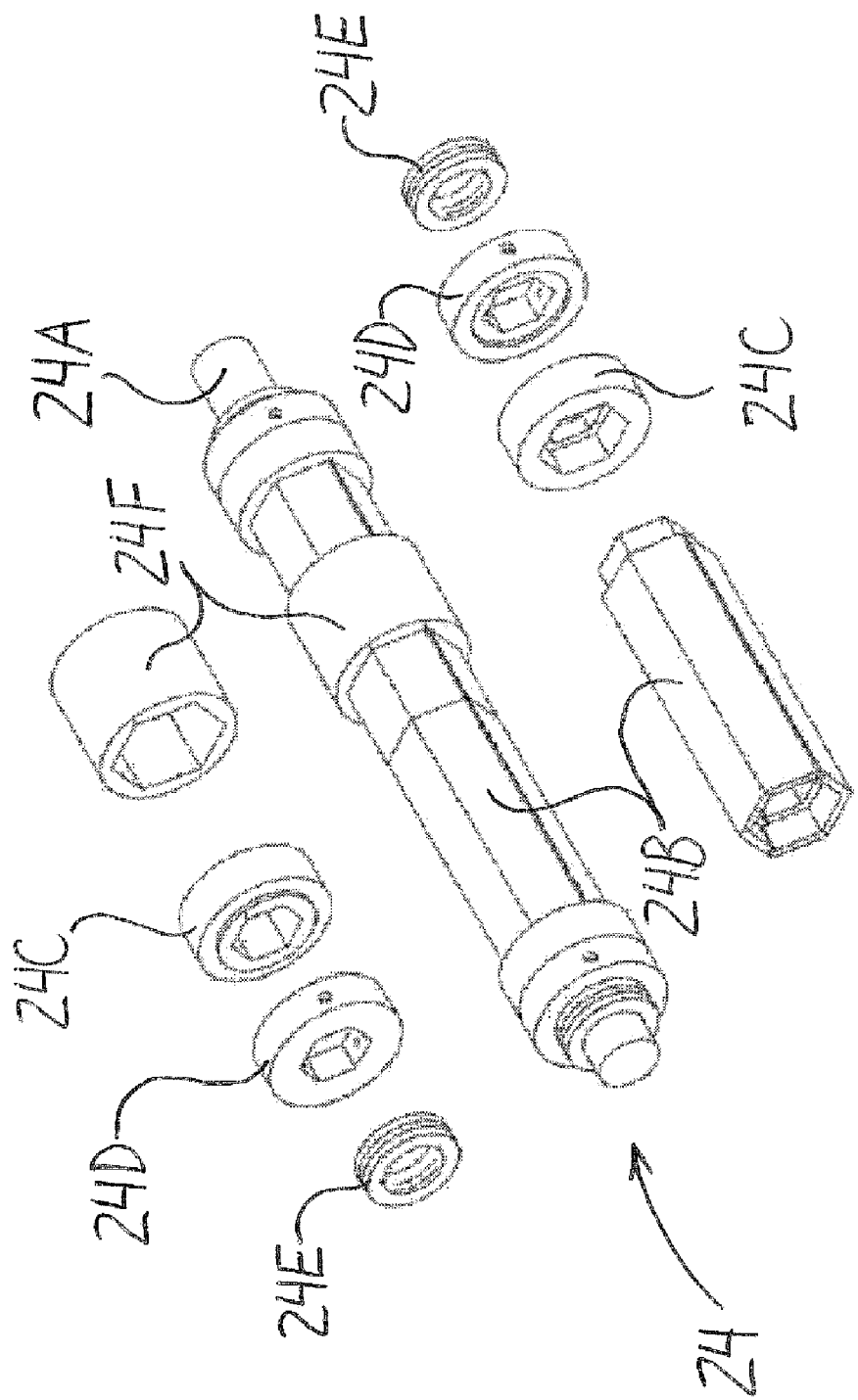

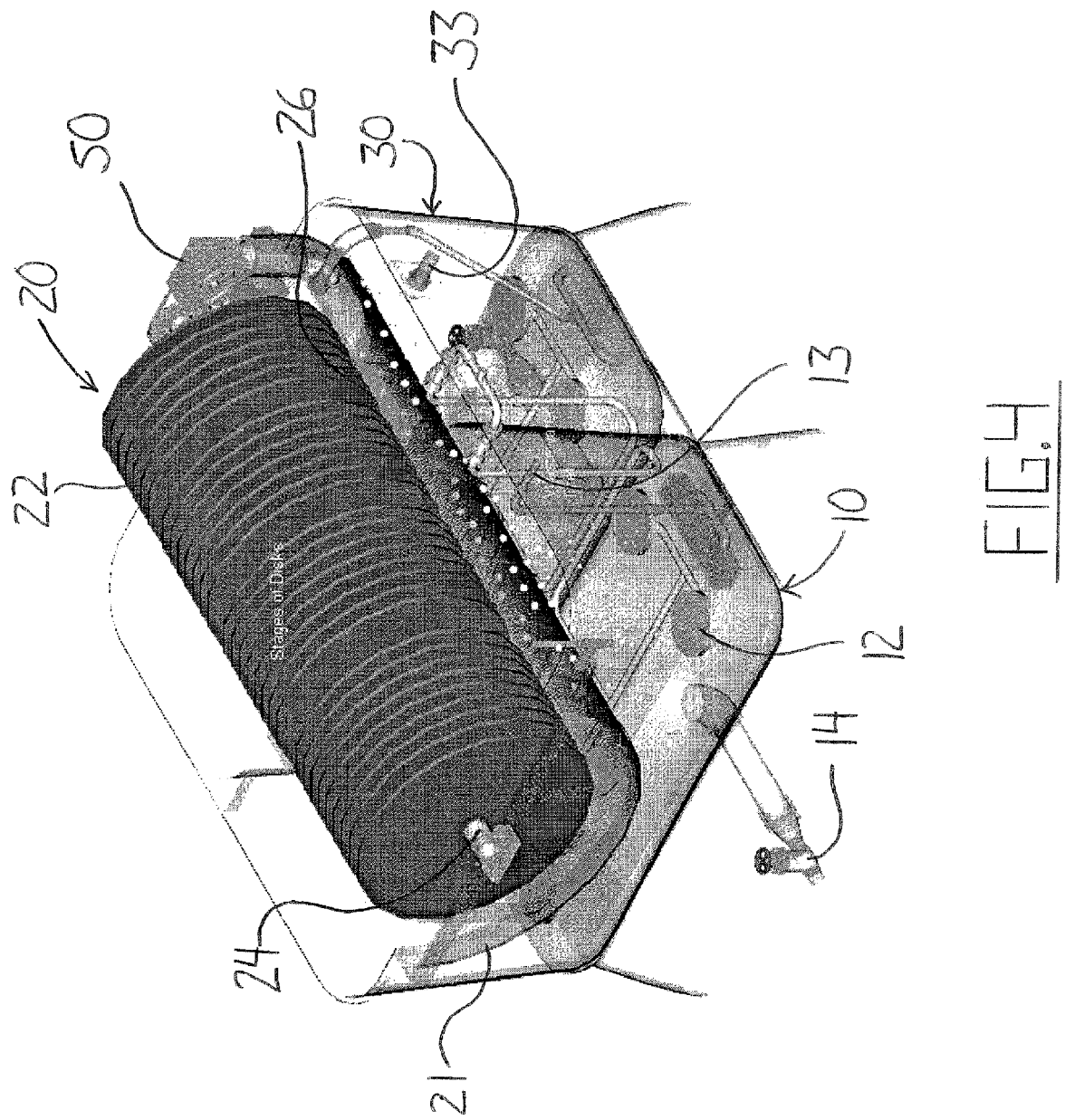

ACTIVE BIOLOGICAL CONTACTOR (ABC); A MODULAR WASTEWATER TREATMENT SYSTEM

This application claims benefit of U.S. provisional application 60/688,713 filed Jun. 9, 2005.

FIELD OF THE INVENTION

The present invention relates generally to the field of wastewater treatment systems.

BACKGROUND OF THE INVENTION

Untreated wastewater of municipal or industrial origin has a severe, negative impact on the environment. This is especially true for the wastewater generated in the food processing industries and in sanitary landfills (landfill leachate). In that sense, the commercial opportunities for decentralized wastewater treatment plants, also known as package plants, are huge. As environmental regulations in industrialized countries become stricter, the installation of obsolete decentralized systems (aeration ponds, septic tanks, trickling filters) will be either banned or severely restricted. Indeed, certificates of approval for many of those methods are already increasingly difficult to obtain. These obsolete technologies are being replaced by compact, efficient and economically effective ones.

The treatment of wastewater from landfills or from wineries and fruit-processing plants is far more complex than the treatment of typical domestic wastewater. Wineries and other agricultural and food processing plants generate wastewater that due to its composition and high organic load, seasonal variability and acid and malodorous nature represent a serious environmental problem. Along with the wastewater, sludge is produced both during wine production and wastewater treatment and is collected at the bottom of tanks, holding ponds, and wastewater treatment units. A winery generates 40 to 60 L of wastewater for each case of wine produced. The nature of the wastewater is extremely variable in quality and quantity throughout the year, as it depends on the soil, the type of grapes, and the winery operation underway at any particular time, and the location where the sample is taken. Thus, although there is not "typical" winery wastewater, the following ranges can serve as useful guidelines for the numerical values of its constituents: pH [2.5-11], $BOD_5$ [700-27,000], COD [500-35,000], TSS [400-6,350], Total Nitrogen [20-350], DO [0.5-3.8], and Total Phosphorous [2-60]. The above seven constituents of winery wastewater are of special interest to regulators due to the high levels found in winery wastewater relative to domestic wastewater. As prime vineyard land becomes increasingly expensive, using less space to deal with the treatment of wastewater is becoming a technical and economic challenge. In addition, increasing both wine production and surcharges for treating their wastewater in municipal plants are inducing wineries to treat their wastewater on-site. Unfortunately, most of the wastewater treatment technologies presently available are either very inefficient, very land intensive or both. Aerated lagoons or ponds are acceptable solutions when both, land is abundant and cheap, and concerns about odours and underground seepage are not environmental issues. In addition, aerated lagoons are hard to control. Indeed, low temperatures and rains can have a very negative effect on the performance of the pond. The hydraulic residence time of the wastewater in ponds is measured in months and foul odours and aesthetically unpleasant sights are common. On the positive side ponds require little supervision. However, the use of ponds is being rapidly restricted and the concession of permits by regulatory agencies is becoming increasingly difficult.

Another rudimentary technology very much used by small wineries, rural business and households is the septic tank. On the positive side is its moderate initial capital cost. On the negative side is the fact that this treatment method is paradoxically recognized as a major water polluter. Its removal efficiency is exceedingly low and its performance is unpredictable as it depends on the nature and topography of the land where it is installed. Furthermore, the owner's sense of responsibility to avoid both the use of certain domestic chemicals and pumping the tank according to certain schedules make the septic tank a primitive and unreliable method. The land requirement relative to its treatment capacity is very high and its use is associated to unpleasant odours and the pollution of aquifers. Septic tanks are a source of widespread concern.

Leachate from municipal landfills and septage from septic tanks, often hauled by trucks for treatment in municipal plants, are even more problematic as sources of wastewater. These types of wastewater contain many unpredictable chemical pollutants including toxic metals, high ammonia concentrations, refractory, chlorinated compounds, domestic chemicals etc. so that conventional biological treatments can be severely affected by toxic shocks or surges leading to operational malfunction of the plant. Municipal wastewater consists of a number of wastewater streams including domestic, industrial, landfill leachate, and septage wastewaters. Thus, although, one cannot talk of a typical municipal wastewater, the following pollutant ranges, obtained from the Municipal Wastewater Treatment EDAR Toledo in Spain, represent well municipal wastewater containing landfill leachate and septage: $BOD_5$ [400-1300] mg/L, COD [ 650-2200] mg/L, TSS [ 300-1700] mg/L, Ammonia [ 50-110] mg/L. In addition, many undetermined pollutants form part of this kind of wastewater. The performances of the Active Biological Contactor (ABC) with the aforementioned wastewaters are presented in this document.

SUMMARY OF THE INVENTION

According to a first aspect of the invention, there is provided a compact wastewater treatment plant comprising three or more bioreactors in series:

a first microbubble/settling chamber having a settling chamber to collect suspended solids and a microbubble chamber with a plurality of diffusers for injecting microbubbles into wastewater;

a rotating biological contactor comprising a plurality of discs arranged for rotation about a shaft, said rotating biological contactor being in fluid connection with the first microbubble chamber; and a second microbubble/settling chamber having a settling chamber to collect suspended solids and a plurality of diffusers for injecting microbubbles in the wastewater, said second microbubble chamber being in fluid connection with the rotating biological contactor.

The wastewater treatment unit is called ACTIVE BIOLOGICAL CONTACTOR (ABC) and comprises three or more bioreactors in series. The first bioreactor or microbubble/settling chamber is preferably partitioned into two chambers by a perforated plate which allows the flow of the entering raw wastewater but reduces its turbulence. As a result the solids suspended in the wastewater settle and are collected at the bottom of the settling chamber. The wastewater passes through the perforated plate and enters the microbubble chamber. Here a set of air diffusers interact with the flowing wastewater by generating microbubbles whose oxygen transfer into the wastewater provide the dissolved oxygen required for effective microbial growth. The oxygen mass transfer is enhanced by the same process observed near the distributors of three-phase fluidized beds. The microbial growth is the basis for the treatment of the pollutants contained in the wastewater;

The second bioreactor is called a rotating biological contactor (RBC) and receives the wastewater flow from the first microbubble/settling chamber. The (RBC) may consist of a semi-cylindrical vessel (cradle) separated by four or more partitions or stages. The wastewater moves from stage to stage over a series of weirs. Each stage contains a variable set of discs arranged for rotation about a shaft. The shaft and sets of discs are installed on top of the cradle and supported by it. The (RBC) receives the wastewater from the first microbubble/settling chamber and discharges it into a third bioreactor.

The third bioreactor is a second microbubble/settling chamber which may be partitioned by a perforated plate into a settling chamber and a microbubble diffusion chamber. In the settling chamber, the turbulence of the flow coming from the RBC (rotating biological contactor) is reduced further to allow the settling of the solids. The wastewater passes through the perforated plate and enters the second microbubble/diffusion chamber. Here, a set of air diffusers generate air microbubbles thus promoting a high rate of oxygen transfer into the wastewater. The wastewater rises until it reaches the outlet where it leaves the second microbubble/diffusion chamber and the wastewater treatment unit.

As stated above, an ABC can be endowed with three or more chambers depending on the kind and amount of contaminants to be treated. Equally well, a unit can consist of two or more RBCs installed in series or parallel.

According to a second aspect of the invention, there is provided a method of treating wastewater comprising:

flowing a quantity of a wastewater into a first microbubble chamber, said microbubble/settling chamber having a plurality of diffusers for injecting microbubbles into the wastewater, thereby promoting oxygenation of the wastewater; said microbubble chamber further including activated sludge for treating the wastewater;

flowing the wastewater from the first microbubble chamber through a plurality of rotating discs, said discs having a biofilm of microorganisms mounted thereon; said discs rotating about a shaft such that a portion of each disc is exposed to air during rotation;

flowing the wastewater into a second microbubble chamber, said microbubble chamber having a plurality of diffusers for injecting microbubbles into the wastewater; and recovering the treated wastewater.

In this method of treating domestic, municipal or industrial wastewater the first microbubble/settling chamber has a dual function to separate and collect the solids, and to process or degrade pollutants. The degradation of the pollutants takes place in the microbubble chambers and in the RBC. The microbubbles produced by the diffusers provide the dissolved oxygen that the microbes existing in the wastewater need for the oxidation or degradation of the pollutants in the wastewater. The microbubble chamber further promotes the microbial growth required for treating the wastewater.

Treating other constituents of wastewater like phosphorous or nitrates can be carried out in additional reaction chambers following the RBC or prior to it. In these chambers chemical coagulants, flocculants or carbon sources, like methanol under anoxic conditions, can be added to achieve more advanced levels of nutrient removal.

The wastewater is flowed from the first microbubble chamber through sets of rotating discs which may be placed in a plurality of connected partitions, the discs having a biofilm of microorganisms attached thereon. The discs rotate about a shaft such that a portion of each disc is partly submerged and partly exposed to air during rotation.

The wastewater is then flowed into a second microbubble/settling or subsequent reaction chambers which may contain, if required, perforated plates for particle collection and a plurality of microbubble air diffusers. The treated wastewater is then collected.

BRIEF DESCRIPTION OF THE DRAWINGS

In the accompanying drawings, which illustrate an exemplary embodiment of the present invention:

FIG. 3 is an exploded view of the shaft arrangement for mounting the discs thereon.

FIG. 4 is a perspective view of one embodiment of a wastewater treatment system according to the invention.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Described herein is a process and the components thereof for treating wastewaters with high organic contamination and low biodegradability. The first case is represented by wastewaters generated by food processing industries (wineries, poultry, pig and cattle farms, fruit processing, fish processing plants, cheese plants, etc). The second case can be found in municipal and domestic wastewaters (subdivisions, hotels, resorts, etc), landfill leachates and bottoms from septic tanks, with chemical contaminants difficult to biodegrade. As will be appreciated by one of skill in the art, "high organic contamination" in regards wastewater may have several definitions, depending on the source of the wastewater. In some embodiments discussed herein, it is assumed that "high strength" refers to anything 3-4 times the concentration of domestic wastewater. For example, BOD>1000 mg/L, TSS>1000 mg/L, TKN>30 mg/L, TP>12 mg/L and $NH_3$>40 mg/L. The biological treatability of wastewater is measured by the $BOD_5$/COD ratio of a given wastewater. A ratio lower than 0.5 indicates the wastewater is difficult to treat biologically. When the ratio is lower than 0.4 the wastewater contains toxic chemicals leading to toxic surges or shocks capable of destroying the biofilm.

Figure 1:
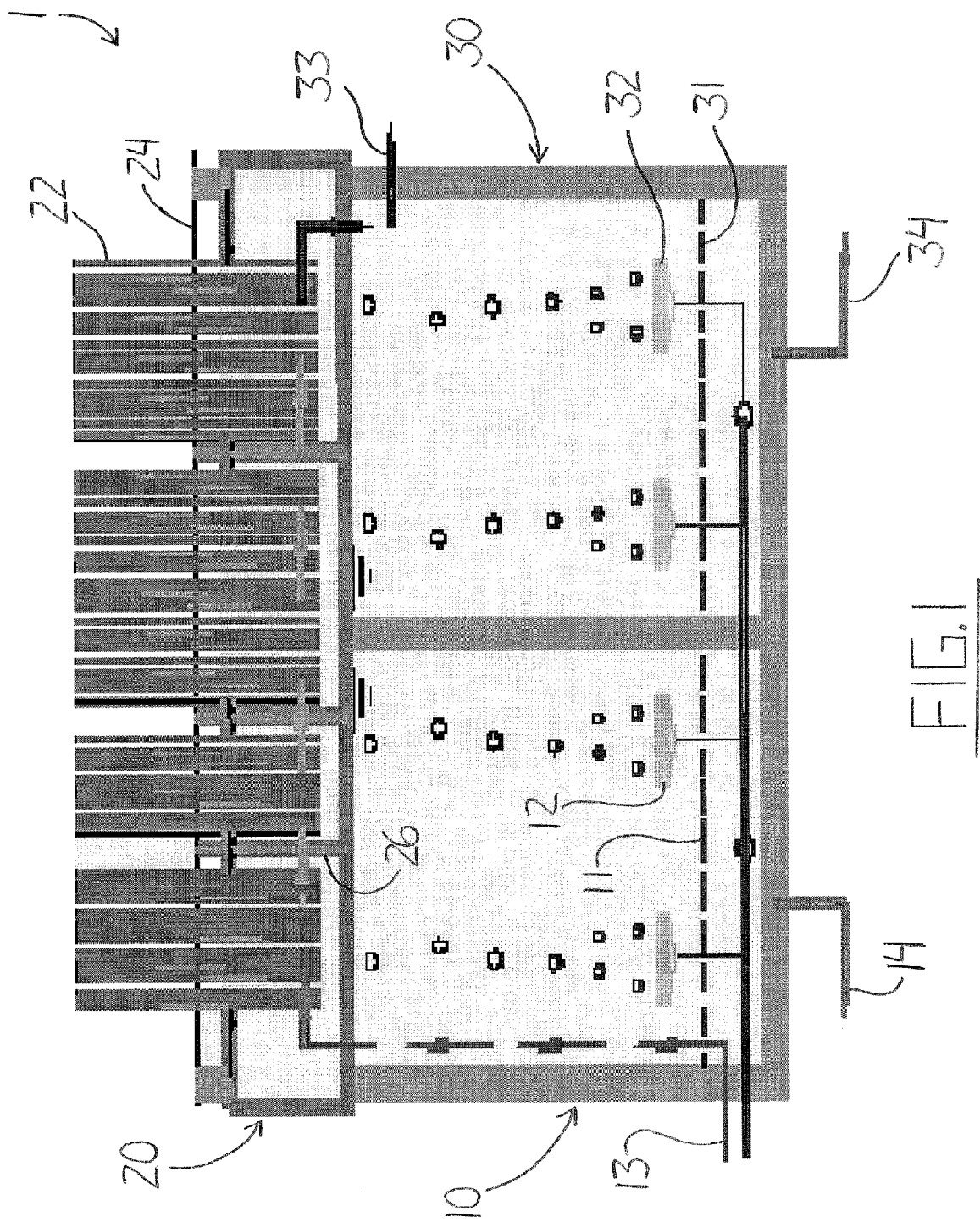
FIG. 1 is a schematic drawing of the treatment unit with two microbubble chambers, a rotating biological contactor and microbubble diffusers.

The process or system comprises a treatment unit 1 with three or more processing zones in series: a first microbubble/settling chamber 10, an RBC 20 and a second microbubble/settling chamber 30, shown schematically in FIG. 1. Additional chambers can be added and may act as either chemical reactors by adding flocculants or biochemical reactors operating under both aerobic and/or anaerobic conditions.

As discussed above, there is a first microbubble/settling chamber 10 located before the RBC 20 and a second microbubble/settling chamber 30 after the RBC. In some embodiments, in the first microbubble/settling chamber 10 takes place microbial growth as a result of the favourable conditions found by the microbes of the influent raw wastewater. In some cases, commercial microorganisms can be used to seed or enhance microbial growth in the microbubble/settling chamber or promote specific microbial processes. Thus, at the bottom of the microbubble/settling chambers 10, 30 takes place both the collection of sludge and above the perforated plates 11, 31 the biological treatment of the wastewater as a result of the intense mass transfer of oxygen from the diffusers 12, 32. Thus, in these chambers take place both the collection of solids or sludge and the oxidation of contaminants. The modular configuration of the ABC permits more intense removal of pollutants by installing them in series thus achieving an effluent quality comparable to that of municipal plants. At the same time hydraulic capacity can be met by installing the units in parallel.

In the first microbubble chamber constituents like TSS and $BOD_5$ are preferably removed as well as smaller amounts of organic nitrogen and phosphorous compounds.

As discussed above, the second bioreactor of the ABC is a rotating biological contactor 20 which comprises a plurality of discs 22, a shaft and sleeve assembly 24, and between four and six partitions or stages inserted in the cradle or semi-cylindrical vessel containing the discs assembly. A power transmission system 50 is provided in the form of a motor to drive rotation of the discs.

Figure 2A:
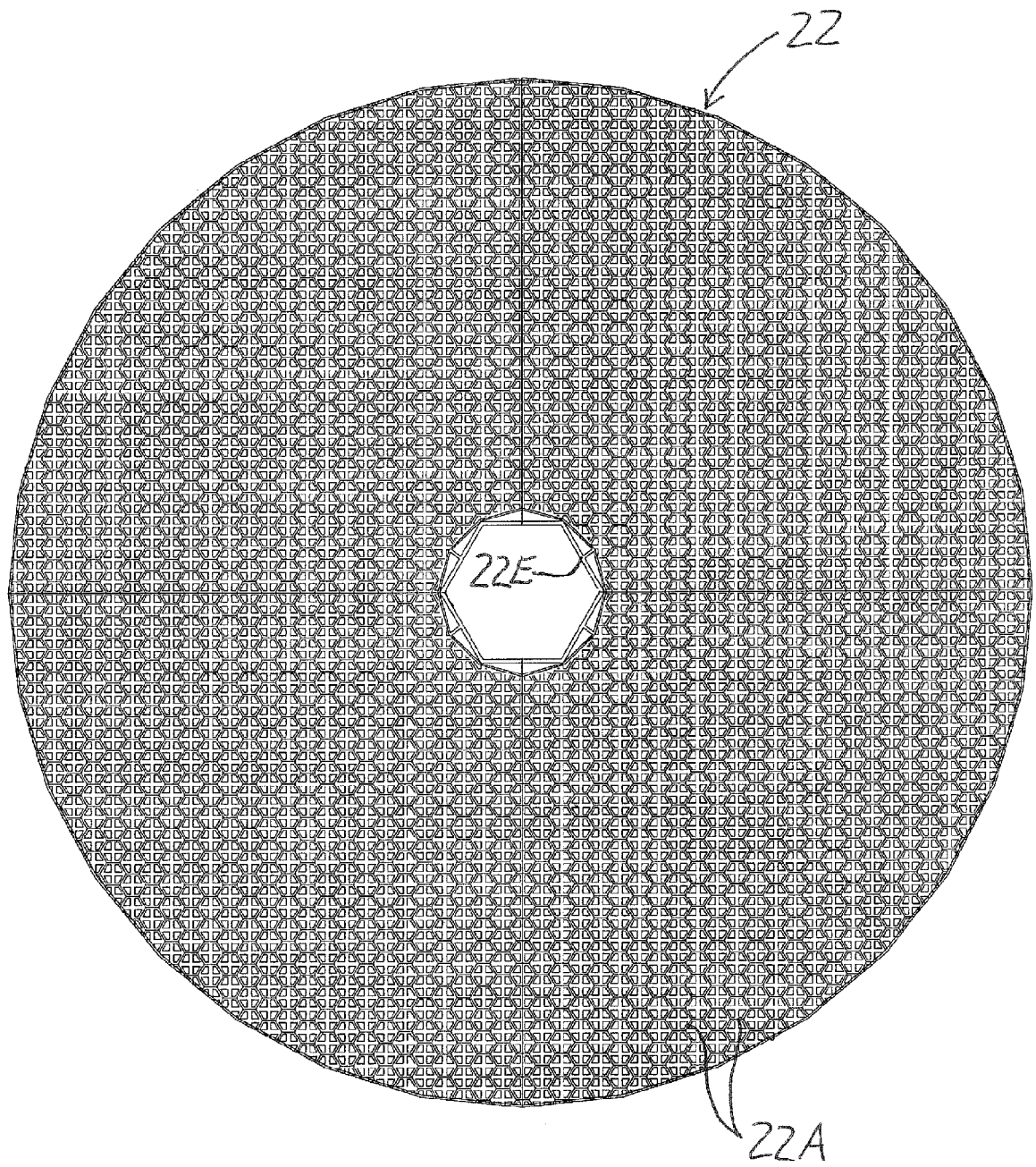
FIG. 2 is a front and side view of a disc of the RBC (rotating biological contactor), and details of several geometrical configurations of the cells.

In a preferred embodiment, as shown in FIG. 2A, a disc 22 has a geometric configuration most visible from the face 27 of the disc 22. Specifically, the disc 22 is composed of an arrayed plurality of geometric cells, for example, hexagon cells 22A, as shown in FIG. 2C. As a result of this arrangement, the disc 22 has an overall surface area approximately twice as large as that of conventional commercial discs used in rotating biological contactors which typically use a "square" cell shape, indicated at 23 in FIG. 2C. In other words, for a disc of fixed diameter and thickness formed by arrayed cells each extending the thickness of the disc it has been found that cells of rectangular cross-section are not the most effective. More specifically, it has been determined that of a number of geometric configurations, cells of hexagonal cross section expose the greatest amount of surface area of the disc-forming material to the wastewater and air during its rotation, thereby increasing the amount of biomass than can be formed on the disc and improving the performance of the RBC. As shown in FIG. 2C, ribs 22B may be provided extending between opposing vertices of the hexagonal cell 22A, thereby creating a plurality of passages 22C extending axially through the disc 22 each formed by a number of surfaces (provided by the ribs) exposed for contact with air and wastewater. By providing more exposed surface area per disc or fixed volume, fewer discs are needed to achieve similar results to a conventional RBC using cells of square cross-section. In other words, the size of the RBC can be decreased to offer the same level of performance, or a unit of improved performance can be provided in the amount of space.

Furthermore, the discs 22 are mounted onto the shaft assembly 24 and are interlocked. The interlocking mechanisms placed symmetrically at, for example, sixteen points on both sides of the discs maintain the discs 22 parallel and rigidly spaced thus preventing their warping. Both the warping of discs and excessive accumulation of biomass on the surface of discs diminish the exposure of the biomass to the air's oxygen. This in turn both decreases drastically the removal efficiency of conventional rotating biological contactors and create odours characteristic of the septic conditions prevalent in thick biofilms. The interlocking mechanisms 22D are shown in the disc side view of FIG. 2B. In the illustrated embodiment, male and female elements of snap fasteners are provided on opposite sides of each disc such that the male elements of one disc can be brought into engagement with the female elements of an adjacent disc to maintain a fixed distance between them. It should be appreciated that the number of interlocking mechanisms and their positions on the faces of the discs may be varied. For example, the number of fasteners needed to maintain sufficient rigidity to prevent warping may vary with the size of discs being interconnected. Various types of fasteners are known and may be used to connect the discs to maintain desired spacing, with snap fasteners providing relatively quick and easy connection of discs within the small spacing desired between them.

It is further of note that the shaft is arranged for easy mechanical installation and is protected against the corrosion caused by vapours and spills from the wastewater. The components of the shaft assembly are shown in FIG. 3. As can be seen, the shaft 24A is enclosed within a sleeve 24B which protects the shaft 24A from corrosion. An end cap 24C, locking cap 24D and nylon bushing 24E are provided in that order on each end of the sleeve 24A. A separator 24F is also provided to fit over the sleeve 24A to separate the groups of discs corresponding to the stages of the RBC. As shown in the Figure, the sleeve 24B and end caps 24C are provided with mating male and female unthreaded features at their connection points such that the connection of one component to the other simply requires only the insertion of a male feature into a receiving female feature. The locking cap 24D is fixed to the shaft 24A, for example by set screws, and then connected to the sleeve 24B by the end cap 24C so that they rotate together with the shaft. As shown, the sleeve may be provided in a plurality of interconnected sections. The straight-lined cross sectional shape, for example the hexagonal cross-section shown, prevents relative rotation between connected components at the male/female connections so that they rotate collectively about the shaft 24A. This eliminates the need for each component to somehow be fixed to the shaft 24A, except at the locking caps 24D proximate the ends thereof. The bushings 24E allow rotation of the shaft 24A, driven by the motor 50, relative to the cradle 21 without causing wear thereto. The shaft assembly is thus easy to assemble with the sleeve sections and end caps simply being insertable into one another at their ends and the through-hole in the separator being shaped, for example the straight-sided hexagonal shape illustrated, to simply slide over the sleeve to the desired position therealong. A straight-sided, for example hexagonal, mounting ring 22E is provided in the center of each disc 22 to fit over the correspondingly shaped sleeve 24B to prevent relative rotation between each disc and sleeve to eliminate the need to somehow fix the disc thereon. Furthermore, as discussed herein, the discs 22 are mounted onto the shaft assembly 24 in close proximity to one another, for example, 2-5 cm apart or 2-4 cm apart or 3-5 cm apart or approximately 3.5 cm apart. As discussed below, the weirs 26 channel the flow of the wastewater past the discs 22 so that the residence time within the RBC of the treatment unit 1 is maximized.

As will be appreciated by one of skill in the art, the diameter of the discs 22 will vary according to the intended use and the size of the treatment unit. In one embodiment, the discs may have a diameter of between 1.0 m and 2 m and may be composed of any suitable material to which microorganisms will adhere, for example, polyethylene.

As will be appreciated by one of skill in the art, the more effective design and assembly of the discs prevent the formation of septic conditions on the discs and therefore avoids offensive odours and promotes high rates of pollution removal. The robust structure of the assembly avoids the warping of the discs and keeps them rigid and flat thus making them more efficient, giving them a longer life expectancy, and thereby reducing costs.

Wastewater is fed into the unit at the wastewater inlet 13 at the first microbubble/settling chamber 10 and eventually exits through the outlet 33 at the second microbubble/settling chamber 30. In FIG. 1, sludge drainage is generally indicated at 14 and 34 for the first and second microbubble/settling chambers respectively. An air inlet 40 is provided for the connection of an air blower for operation of the diffusers.

Typical of biological treatment systems, very acid or basic wastewater (11<pH<3 require pre-treatment or neutralization). The same pre-treatment is required from wastewater with concentrations of fat, oil and grease (FOG) greater than 50 mg/L and in general conditions preventing microbial growth. As discussed below, wastewaters such as these must be pre-treated prior to their processing in the ABC described herein.

Specifically, for optimum treatment by the ABC described herein, wastewater must have $BOD_5$, TSS, pH, T, DO, NH3, TKN within the following ranges

| | |
|---|---|
| pH | 3-10 |
| $BOD_5$ (mg/L) | 50-27000 |
| TSS (mg/L) | 50-4024 |
| Total Nitrogen (mg/L) | 5-240 |
| Total Phosphorous | 2-40 |

In some embodiments, the waste water is treated without pre-treatment or equalization. However, in some embodiments, when the pH of the influent is exceedingly acidic, the pH of the raw wastewater is raised to a pH between 6 and 7, for example, by adding NaOH or another suitable base known in the art. This is a necessary step because at very low pH the biofilm either does not grow or grows very slowly, as discussed herein.

As will be appreciated by one of skill in the art, "extremely acidic" is a pH equal to or less than 3.

The preferred temperature for the process is within a range of temperatures between 15° C. and 35° C. At 5° C. many microbial processes stop or are very slow.

As discussed below, the performance of the Active Biological Contactor 1 is comparable or superior to that of well established technologies found in large municipal plants like activated sludge. In addition, RBCs are well known for their high efficiency converting ammonia (nitrification). Thus, because of the flow configuration of the ABC, the surface geometry and interfacial area of the discs 22, the ABC used herein 20 has a very high $BOD_5$ removal efficiency and it is comparable to that of centralized municipal plants using biological processes. That geometry of the surface of the discs also prevents the formation of very thick layers of biomass by sloughing the excess of biomass grown. Thick layers of biomass have a reduced rate of pollutant oxidation and contribute to the mechanical stress of the shaft assembly. As discussed above, discs with large surface area promote the growth of microbial populations and biomass. For a given diameter and thickness, the surface area of a disc depends on the geometry of its surface. For example, in some embodiments, the thickness of the film of bacteria may be 1-6 mm, 2-6 mm, 3-6 mm, 4-6 mm, 1-5 mm, 2-4 mm, 1-4 mm, 2-5 mm, 3-5 mm or 3-4 mm.

As discussed above, the discs' assembly and the interlocking of the discs keeps the discs uniformly parallel and flat. The interlocking mechanism consists of a series of male-female attachments that permit the discs to snap together with each other and also keeps a fixed gap between discs. This maintains a permanent air gap between neighbouring discs which in turn promotes high aeration efficiency. As will be known by one of skill in the art, other commercial RBCs lacking the interlocking mechanism lose the air gap between the discs over time as a result of the warping of the discs caused by the weight of biomass overload. That in turn reduces the aeration efficiency and consequently promotes anaerobic or septic conditions and leads to undesirable odours and higher maintenance costs. Thus, the RBC 20 has a large interfacial area which makes possible higher performance, lower electric consumption and no septic odours. Because of the stiffness of the discs and the fixed gap between the surfaces of neighbouring discs, those surfaces do not touch each other and the biomass from them remains in contact with the air, as discussed below. Specifically, the discs are arranged such that in use, approximately 40% of the disc surface is submerged in the wastewater. In other embodiments, 30-50% of the disc surface may be submerged in the wastewater.

Thus, the system provides solids or sludge collection, high organic load removal, high biological phosphorous removal, and high organic nitrogen removal in a reduced construction space and/or high performance, as well as the following benefits:

1) Capacity to treat both high-strength industrial wastewater and municipal wastewater without recirculation.

2) Excellent removal efficiency and short hydraulic residence times

3) Small, compact and modular. No prime land wasted

4) Continuous treatment

5) Low maintenance level. Requires less skilled labour and control systems than activated sludge processes, including sequencing batch reactors (SBR)

6) No undesirable odours. Reduced production of sludge

7) Cost effective. More economic than aeration ponds, septic tanks plus leaching beds, sequencing batch reactors, and other activated sludge plants.

The use of activated sludge and its version, SBR is well-known for in the treatment of domestic wastewater but the use thereof with winery wastewater has previously been very disappointing. In comparative studies carried out in some pilot plants with both activated sludge and rotating biological contactors, the results have confirmed the superior performance of the latter. Tofflemire (1972) also reports the following drawbacks in the use of activated sludge plants treating winery wastewater:

1. Activated sludge is very vulnerable to toxic shocks and variable loadings, a condition very common in wine production. This can be made extensive to the use of municipal wastewater with septage and landfill leachate.

2. The high $BOD_5$ influent produces extended aeration periods and sludge bulking.

3. Activated sludge demands very close operational controls and pH adjustments are required.

4, Large land area is required.

Performance of the ABC Unit Treating High-Strength Winery Wastewater

The performance of the treatment unit 1 was evaluated following the regulations of the Ontario Ministry of the Environment and Energy (MOE) regarding discharges of treated effluent. The ranges of concentrations of the constituents in this test are shown in TABLE 1.

TABLE 1

SUMMARY OF AQUACAN ™ (ABC) 6000 PERFORMANCE(*)

| Constituents | Raw Wastewater Composition | Effluent Composition | % Removal |
|---|---|---|---|
| Flow (L/Day) | 2000 | 2000 | N/A |
| $BOD_5$ (mg/L) | 2500 | 112 | 95.5 |
| TSS (mg/L) | 1354 | 179 | 86.8 |
| pH | 6.3 | 8.3 | N/A |
| TP (mg/L) | 8.0 | 4.7 | 41.2 |
| TKN (mg/L) | 68.6 | 38.7 | 43.6 |

(*)All figures based on a 95% level of confidence and 13 degrees of freedom

The growth of the biomass on the surface of the disks 22 was achieved by seeding the unit with secondary sludge brought from the Niagara Falls wastewater treatment plant. Sludge was distributed in several stages of the unit. Next, after the unit had been filled up with the winery wastewater, the unit was started up. The wastewater flowed through the unit while the microorganisms present in the sludge adapted to their new environment. After three weeks, the microorganisms present in the wastewater adhered on the surface of the disks creating a very thin layer or biofilm that increased with time until reaching steady state. Specifically, as will be apparent to one of skill in the art, the biofilm grows on the surface of the discs shown in FIG. 2.

The biofilm developed with a wastewater flow of 0.5 L/min while the disks rotated at 5 RPM. After approximately one month, the biofilm reached steady state. As will be appreciated by one of skill in the art, the thickness of the biofilm is directly influenced by the rotation of the discs, the nature of the influent and the flow rate of the wastewater.

It is of note that in some embodiments, the material used to seed for the growth of biomass are the microorganisms found in wastewater and sludge. In our case, those seeds can be obtained from the sludge collected in domestic wastewater treatment plants. Alternatively and for some special applications, biomass can also be grown with commercial microorganisms. Most of the times, the sludge from a given type of industrial wastewater is the ideal seed for the growth of the biomass in that kind of treatment. For example, the sludge from the bottoms of the fermentation vessels in wineries is an ideal seed for the biomass used in the treatment of wastewater from wineries.

A typical process run is shown in FIG. 4 and described below.

The system comprises a storage-pretreatment tank also referred to as an equalization tank, a liquid pump, an air blower, and an ABC treatment unit 1.

For use, the equalization tank is filled with the wastewater. It is of note that if the wastewater contains very high levels of suspended solids, the wastewater is pro-treated in a sedimentation tank and filtered prior to the equalization tank. The purpose of the equalization tank is to precondition the wastewater for pH, temperature and flow as it enters the water treatment system.

Next, the air valves on the microbubble chamber are opened and the air blower is turned on to allow air to reach the microbubble diffusers at the bottom of the first microbubble chamber 10.

Next the wastewater is fed to the treatment unit 1. That is, from the equalization tank the wastewater is pumped into the microbubble chamber 10 of the ABC 1. The water next flows into the first stage of the RBC 20 where the discs 22 are contained. In some embodiments, the discs 22 are assembled in a semi-cylindrical vessel, or cradle, 21 made of fibreglass or steel and divided into four or more compartments or stages. Specifically, the wastewater passes from the first microbubble chamber 10 where initial aeration takes place as discussed above, into the RBC 20 which comprises a series of stages due to the presence of the weirs 26 which direct the flow of the wastewater and thereby increase the residence time of the wastewater in the rotary biological contractor 20. Thus, from the first stage the wastewater moves into the subsequent stages through a series of weirs 26 placed as separation walls between stages. The wastewater moves through the stages in a zigzag fashion to maximize its residence time. The wastewater exiting the last stage of the RBC enters the second microbubble chamber 30 where further aeration/sedimentation takes place, as discussed above. Finally, the wastewater rises to the level of the outlet where it exits. This wastewater can be either discharged or introduced to additional or other treatment unit(s) for further treatment. For the first three weeks the wastewater in the vessel should be kept with adequate nutrients and very low flowrates to promote the growth of biomass on both the surface of the discs and in the first microbubble chamber.

The wastewater from the winery contained a very high concentration of solids and those solids tend to sediment in the equalization tank before reaching the treatment unit. The solids are removed periodically. The removal frequency depends on the amount of solids in the wastewater received. It can go from weekly removal to twice a month or even less. Exact determination of the sludge produced is difficult since the determination of a number of biological parameters is highly uncertain. Thus the sludge produced for every industrial case must be empirically determined.

As will be appreciated by one of skill in the art, the conditions in the first microbubble chamber and the rotating biological contactor are different and hence the biomass suspended in the microbubble chamber 10 is different from that attached to the surfaces of the discs. That is, different microorganisms will flourish under the different conditions, meaning that the makeup of the biofilm is not identical in the two chambers. Therefore, the processes to remove the pollutants are also different. The thickness of the biofilm on the discs is determined by the nature of the wastewater, by the operating conditions, by the geometry of the surface of the disc and by the rotational speed of the disc, as discussed above.

Hernder Estate Wines, St. Catharines, ON has explored the efficient treatment of the wastewater resulting from its winemaking processes. In Ontario, the Ministry of the Environment and Energy is taking steps to make sure that winery wastewater is adequately treated.

As indicated previously the sampling and analysis of the wastewater and treated water was carried out only by accredited employees of E3 Laboratories of Niagara on the Lake, a certified environmental laboratory of Niagara-on-the Lake, Ontario. The parameters measured in this evaluation presented in Table 2 are: flow rate; temperature; total phosphorous; $BOD_5$; CBOD5; TSS; pH; TKN; DO; $NH_3$.

For example, the biofilm developed on the discs 22 in this example with winery wastewater of high organic strength, a flow of 0.5 L/min and a disc rotating velocity of 5 RPM was fully established in four weeks. Once the biofilm reached steady state, the unit was ready to operate and samples were collected and analyzed by E3 Laboratory. The testing procedure for the treatment unit 1 using winery wastewater was carried out as follows:

1. The wastewater was collected in a cylindrical tank having a 24 $m^3$ capacity located on the back of the winery. From this tank, the wastewater was transported to the feed tank.
2. Once the feed tank was full of wastewater, the submergible pump in the feed tank started to pump wastewater into the treatment unit 1 at the flow rate of 1.4 L/min (average 2000 L/day). This water went through the system in the following sequence: 1) Settling Chamber; 2) Microbubble Aeration Chamber 1; 3) Rotating biological contactor; 4) Second Settling Chamber; and 5) Microbubble Aeration Section 2.
3. The feed tank was provided with a water level control system. Consequently, the volume of wastewater treated was evaluated by checking the water level difference in the tank.

As will be appreciated by one of skill in the arts there are many variables that must be taken into account when designing a wastewater treatment plant but the amount of wastewater per unit of time (flow rate) and the characteristics of the wastewater are paramount. By measuring the difference in the water tank level we can calculate the volume treated per unit of time.

4. A heating system was used to keep the temperature of the housing containing the system above 15° C. and the wastewater temperature in the feed tank around 15-20° C.

As explained before the optimum temperature range for most microorganisms is 15 to 30° C. However, different wastes require different microorganisms and therefore different optimum temperatures.

5. After the feed tank was full, the wastewater was pumped to the unit. The blower providing air to the four diffusers at a rate of 100 L/min per diffuser was turned on. The aeration chambers both have 4 air diffusers each.

The material entering the first micro-bubble aeration section is called "influent" and is the wastewater to be treated. There are two main types of wastewater. These are domestic or municipal wastewater and industrial wastewater. Municipal wastewater changes moderately from population to population unless it cares other influents like land fill leachate. However, the nature of industrial wastewater changes very much from industry to industry. The parameters that characterize industrial wastewater change a great deal qualitatively and quantitatively. Depending on the nature and quantity of a given wastewater the engineer calculates the number of diffusers or aerators that can dissolve more effectively oxygen in the wastewater.

6. After leaving the Microbubble Section 1, the wastewater goes through the RBC where the disks rotated at five revolutions per minute.
7. Upon leaving the RBC the wastewater flows went into the second settling chamber and then to the second microbubble chamber where the water is also aerated injecting air at a rate of 100 L/min per diffuser. The water leaving the second microbubble chamber is the final effluent.
8. As the water went through the treatment unit 1, samples of water were taken at the inlet and outlet of the unit. These samples were collected and analyzed by E3 Laboratories. Personnel of E3 Laboratories recorded the volume of wastewater treated according to the specifications set by the Canadian Ministry of the Environment.

As opposed to other sources of wastewater from the food industry, winery wastewater is highly variable in both strength and flow rates. Therefore, preparing a testing program to evaluate the performance of the treatment unit 1 must include a variability factor in the quality and quantity of the influent and therefore of the effluent. Because of that tremendous variability in the quality and quantity of the influent, is difficult to set the terms of reference in advance. For example, if we want to know how the unit is going to perform during nitrification, we need to set the operating conditions so that either bleach or chlorine are not discharged without the previous knowledge of to the operators of the unit. Otherwise, we cannot make a total nitrogen balance based only on $NH_3$, TKN, $NO_3$, and, $NO_2$ because the presence of chloramines can be substantial and they are seldom analyzed. These variations are both seasonal and operational or process dependent.

A Flow Rate (FR)

The flow was kept quite constant. However in three instances accumulation of heavy solids from the raw wastewater produced same obstructions and lower flow in the pipes connecting the feed tank with the treatment unit. Thus the flow rate for the test was established at 2000±431 L/day. That is, the treatment unit was fed an average of 2000 L/day 95% of the time.

B. Removal of Biochemical Oxygen Demand ($BOD_5$)

Figure 5:
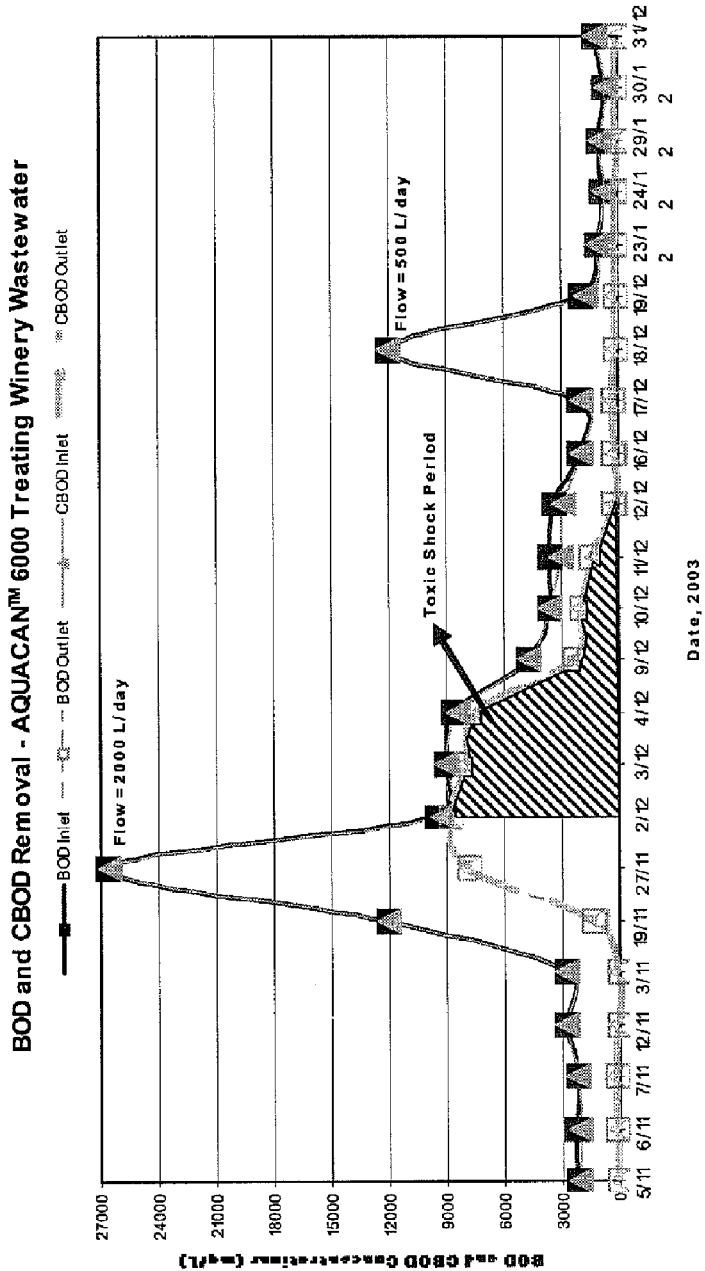
FIG. 5 is a graph of BOD and CBOD at the inlet and outlet of the wastewater treatment system.

In this document $BOD_5$ stands for five-day $BOD_5$ or Total $BOD_5$ as opposed to CBOD or carbonaceous $BOD_5$. The removal performance of the unit is shown in FIG. 5 and Table 3.

The unit suffered an unexpected and severe discharge of the germicidal $Ca(ClO)_2$ (HTH, Bleaching granules) thus producing a toxic shock. The recovery of activated sludge plants from a toxic shocks occurs after 3-4 weeks. The ABC unit re-established its biofilm in 10 days exhibiting an excellent recovery capacity.

In several instances the wastewater had extremely high surges with values exceeding 12,000, and 27,000 mg/L of $BOD_5$. The $BOD_5$ percentage removal was 89%, and 70% respectively. These values were excluded from the statistical analysis, as they are far higher than the preset 2000 mg/L inlet values. However, the percentage of removal shows the robustness of the unit to treat even extraordinarily high organic loads without any previous treatment (FIG. 5). As shown In Table 3, the treatment unit can process wastewater with an average influent $BOD_5$ of 2500 mg/L, and produce an effluent of 112±37 mg/L, 95% of the time. This corresponds to a 95% average removal of BOD.

C. Removal of Total Suspended Solids TSS

Figure 6:
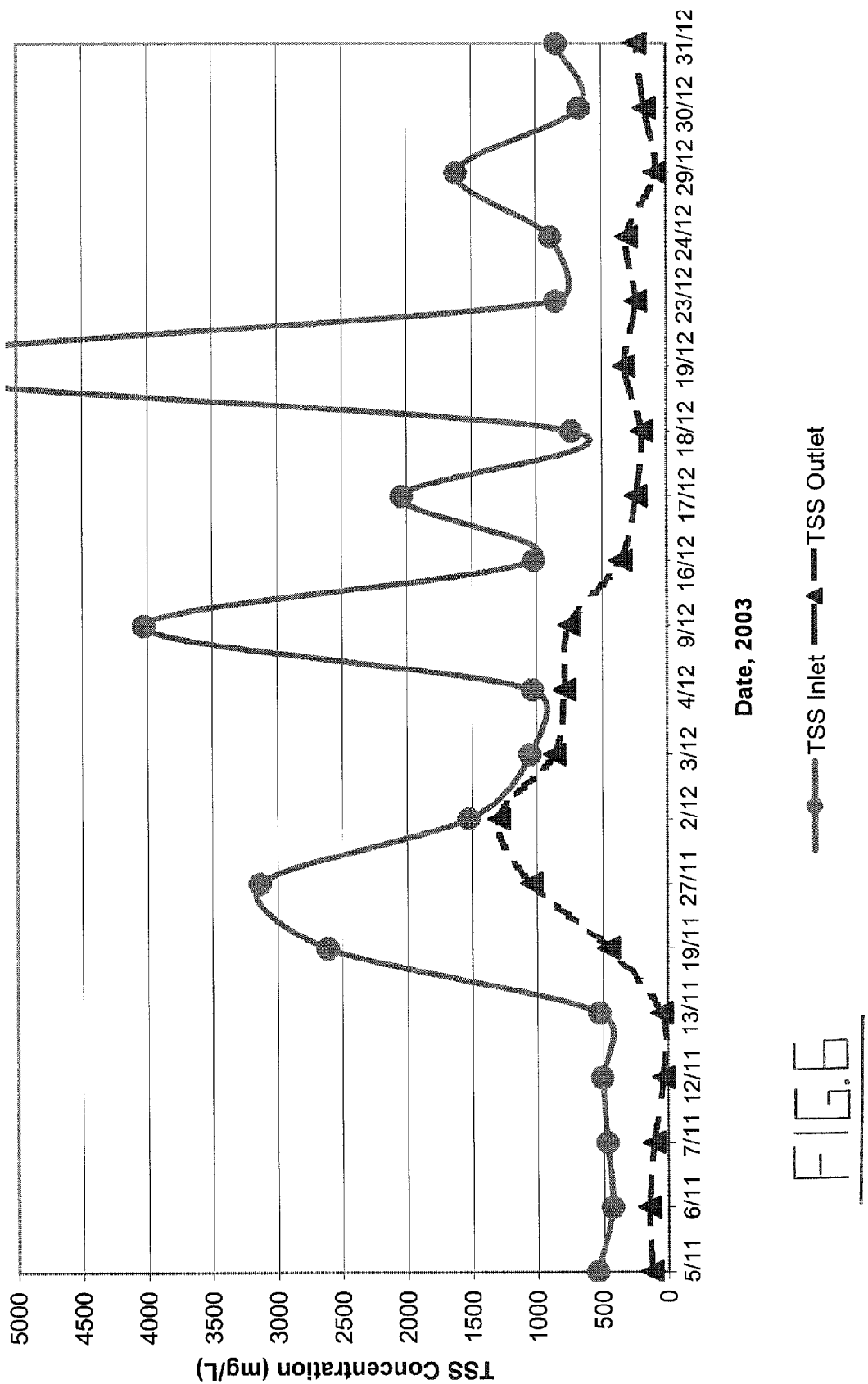
FIG. 6 is a graph of TSS at the inlet and outlet of the wastewater treatment system.
Figure 7:
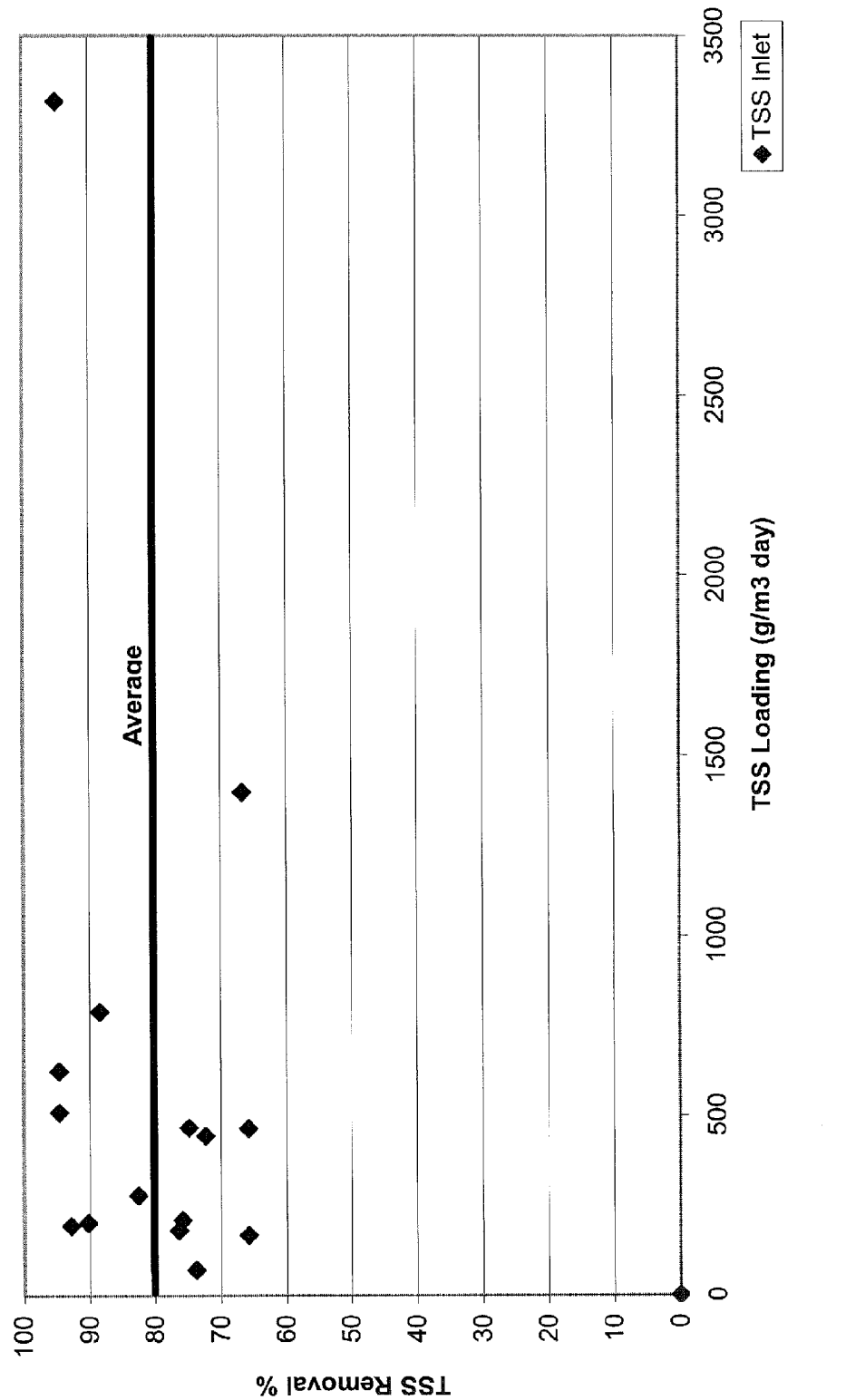
FIG. 7 is a graph showing percent TSS removal for different loads.

The total suspended solids in the raw wastewater ranged from 432 to 6340 mg/L during the testing period. As shown in FIG. 6, the peaks representing the inlet concentrations coincide with those shown in FIG. 5 for $BOD_5$. That is the suspended solids are clearly of biological origin. Indeed, comparing again FIG. 5 with FIGS. 6 and 7 we can see that the worst removal of TSS coincides with the organic overload followed by the chlorine toxic shock. The average TSS of the treated effluent is 179.1±52 mg/L. Thus, the treatment unit can treat a raw wastewater with 1354 mg/L of TSS and produce an effluent of 179 mg/L of TSS. That results in an average removal of 86.8%, 95% of the time.

D. pH

The pH of the raw wastewater ranged from 3.7 to 9.2. The highest value was recorded as a result of the discharge of the bleaching granules. Table 1 shows that the average pH during the test period was 8.3. Thus, the treatment unit can treat a raw wastewater with a pH of 6.3±0.7 and produce an effluent of 8.3±0.3, 95% of the time.

E. Removal of Total Phosphorous (TP)

As shown in Table 3, the total phosphorous removal in the wastewater ranged from 2.2 to 40 mg/L with an average of 8.0 mg/L, 95% of the time. Based on the results shown this is the claim for this constituent. Thus the treatment unit can treat a raw wastewater with an average concentration of TP of 8.0 mg/L to produce an effluent of 4.7 mg/L. That is equivalent to a 41.8% removal 95% of the time. That removal efficiency compares very favourably with most aerobic biological processes where the removal efficiencies are 20-35%. The biological phosphorous removal of the ABC can be complemented with chemical removal methods and produce effluents with TP concentration well below 1 mg/L without using complex reactor configurations like aerobic/anaerobic biological treatments.

F. Total Kjeldhal Nitrogen (TKN)

As shown in Table 1, the TKN in the raw wastewater ranged from 15.9 to 234 mg/L with an average of 68.6 mg/L, 95% of the time. The TKN showed the highest continuous concentration at the outlet for the period that is consistent with the toxic shock experience by the discharge of the granular bleach. The results indicate that the unit can treat a raw wastewater with an average concentration of 68.6 mg/L and produce an effluent of 38.67 mg/L or 43.6% removal 95% of the time.

Performance of the ABC Unit Treating Municipal Wastewater Containing Landfill Leachate and Septage As opposed to typical domestic wastewater, the nature of this wastewater is much more difficult to treat given the unpredictability of the type and concentration of pollutants it carries.

As a result of an agreement between ECOTECHNOS Inc. (Toronto) the manufacturer of the ABC (AQUACAN™) and the Spanish corporation Aqualia (Madrid), the performance of the ABC technology (AQUACAN™) has been evaluated. Municipal wastewater containing a mixture of industrial wastewater, landfill leachate, septage from local septic tanks, and typical domestic sewage was treated and the performance of the technology evaluated. A 6000 L/day unit was installed and tested in one of the municipal wastewater treatment plants (EDAR Toledo) of the city of Toledo, Spain between February 2005 and December 2006. The characteristics of the wastewater as well as the monthly removal efficiency of the unit are presented in Table 2 for the removal of $BOD_5$, COD, TSS, and $NH_4$. In addition, it is shown the $BOD_5$/COD ratio as an indicator of the biological treatability of that particular wastewater. The influent wastewater did not have primary treatment only pre-treatment. Also, as a result of the Municipal Plant scheduled maintenance in the months of April and May 2005 the ABC received exceedingly large loads of non-biodegradable compounds leading to severe toxic shocks from which recovered fast.

The unit was installed and started up in 12 hours by three operators not previously trained in the installation of the ABC. The chemical analyses of the parameters shown below were performed by qualified personnel of the Municipal Plant. As a result of the operation and maintenance in the Municipal Plant the flow and steady feed conditions had numerous surges and were not established until May when the biofilm build up began. The biofilm is established in 3-4 weeks except when $BOD_5$/COD ratio is low as in the present case. In this case the biofilm was developed at the end of May and was fully operational until the end of the testing program in December 2005.

TABLE 2

Characteristics of the Wastewater and Average Monthly Performance of the AQUACAN ®

| | BOD(mg/l) | | | COD(mg/l) | | | Ratio |
|---|---|---|---|---|---|---|---|
| Date | Inlet | Outlet | Removal | Inlet | Outlet | Removal | BOD/COD |
| March | NA | NA | NA | 2,016.00 | 1,046.00 | 48.00 | NA |
| April | 808.33 | 280.33 | 63.06 | 1,665.55 | 866.65 | 46.55 | 0.44 |
| May | 621.11 | 236.67 | 61.13 | 1,424.63 | 699.32 | 51.18 | 0.46 |
| June | 304.09 | 110.14 | 63.62 | 647.00 | 319.77 | 49.60 | 0.47 |
| July | 295.24 | 34.10 | 88.28 | 602.52 | 119.19 | 80.15 | 0.49 |
| August | 288.42 | 37.42 | 86.78 | 579.05 | 130.49 | 77.30 | 0.50 |
| September | 260.63 | 33.13 | 87.53 | 593.06 | 143.31 | 75.70 | 0.44 |
| October | 253.16 | 26.32 | 89.47 | 692.21 | 154.16 | 73.91 | 0.43 |
| November | 314.62 | 32.00 | 89.86 | 724.69 | 165.23 | 77.25 | 0.44 |
| December | 298.33 | 28.50 | 90.43 | 592.67 | 143.17 | 76.00 | 0.51 |

| | TSS(mg/l) | | | NHNH4+ | | |
|---|---|---|---|---|---|---|
| Date | Inlet | Outlet | Removal | Inlet | Outlet | Removal |
| March | 1,322.00 | 611.30 | 53.70 | 64.30 | 50.30 | 21.60 |
| April | 1,173.63 | 716.95 | 37.49 | 60.37 | 46.22 | 22.03 |
| May | 1,026.71 | 518.57 | 50.13 | 53.58 | 37.89 | 28.64 |
| June | 349.09 | 153.86 | 56.97 | 47.37 | 3.27 | 93.04 |
| July | 283.43 | 40.90 | 85.49 | 45.88 | 2.00 | 95.63 |
| August | 288.16 | 36.53 | 88.90 | 44.92 | 2.00 | 95.54 |
| September | 298.25 | 42.81 | 85.71 | 45.33 | 2.00 | 95.57 |
| October | 302.63 | 35.74 | 88.12 | 46.93 | 2.00 | 95.72 |
| November | 320.46 | 31.69 | 90.11 | 47.43 | 2.53 | 94.66 |
| December | 288.67 | 30.67 | 89.39 | 46.94 | 3.30 | 93.24 |

These are the most important parameters evaluated during the treatment of municipal wastewater mixed with landfill leachate, industrial wastewater, septage from septic tanks, and typical domestic sewage: Flowrate, $BOD_5$, COD, TSS, and $NH_4$.

A. Flowrate

As a result of the works of maintenance the flow to the ABC unit was unregulated ranging from 12000 L/day to no flow at times. The flowrate was set at 6000 L/day during the first three months and at 3000 L/day the remaining eight months. The unit is designed for a flow of 6000 L/day of typical domestic sewage. However, the wastewater used had a low $BOD_5$/COD ratio (See Table 2 and FIG. 8) which makes it difficult to treat biologically and produce toxic shocks).

B. $BOD_5$ Removal

The inlet concentration of $BOD_5$ during the ten months of the testing program ranged between 1400 mg/L and 300 mg/L. The average $BOD_5$ removal performance for the six months following the development of the film was 90%. This confirms the robust nature of the process considering that as a result of the scheduled maintenance program and works in the raw sewage well the unit experienced in April a severe toxic shock as indicated by the $BOD_5$/COD ratio=0.3. (See FIG. 8 and FIG. 9)

C. COD Removal

Figure 10:
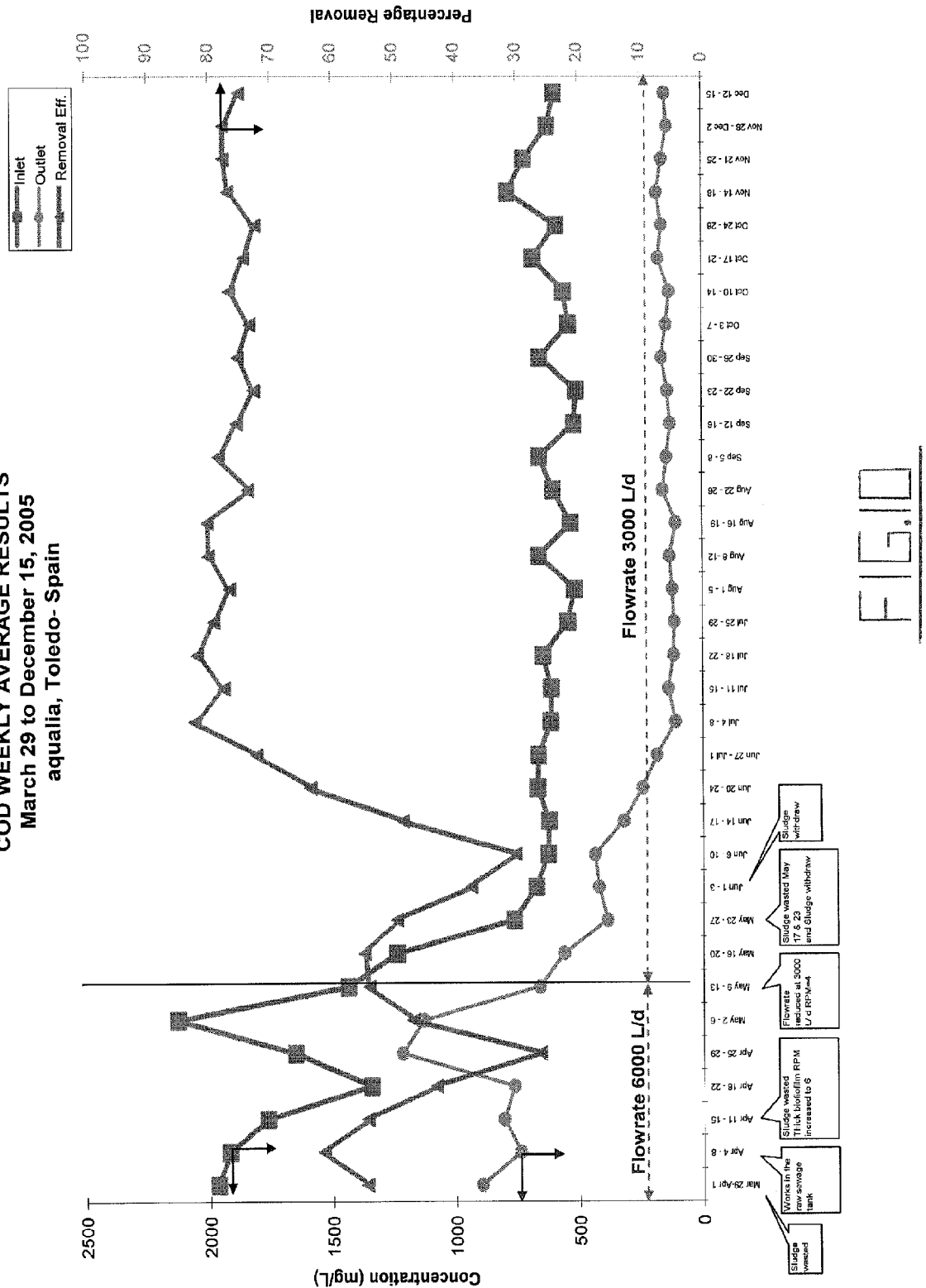
FIG. 10 is a graph of the ABC unit performance removing COD. The weekly removal efficiency with municipal wastewater (including leachate) in Toledo, Spain is shown for the period between March 2005 and December 2005.

The removal efficiency of COD was as expected lower than that of $BOD_5$ due to the strong presence of chemicals non-biodegradable. A COD removal ranged between 74% and 80% for the period July-December 2005 when the biofilm was well established. FIG. 10 exhibits the weekly average performance removal of the unit.

D. $NH_4$

Figure 11:
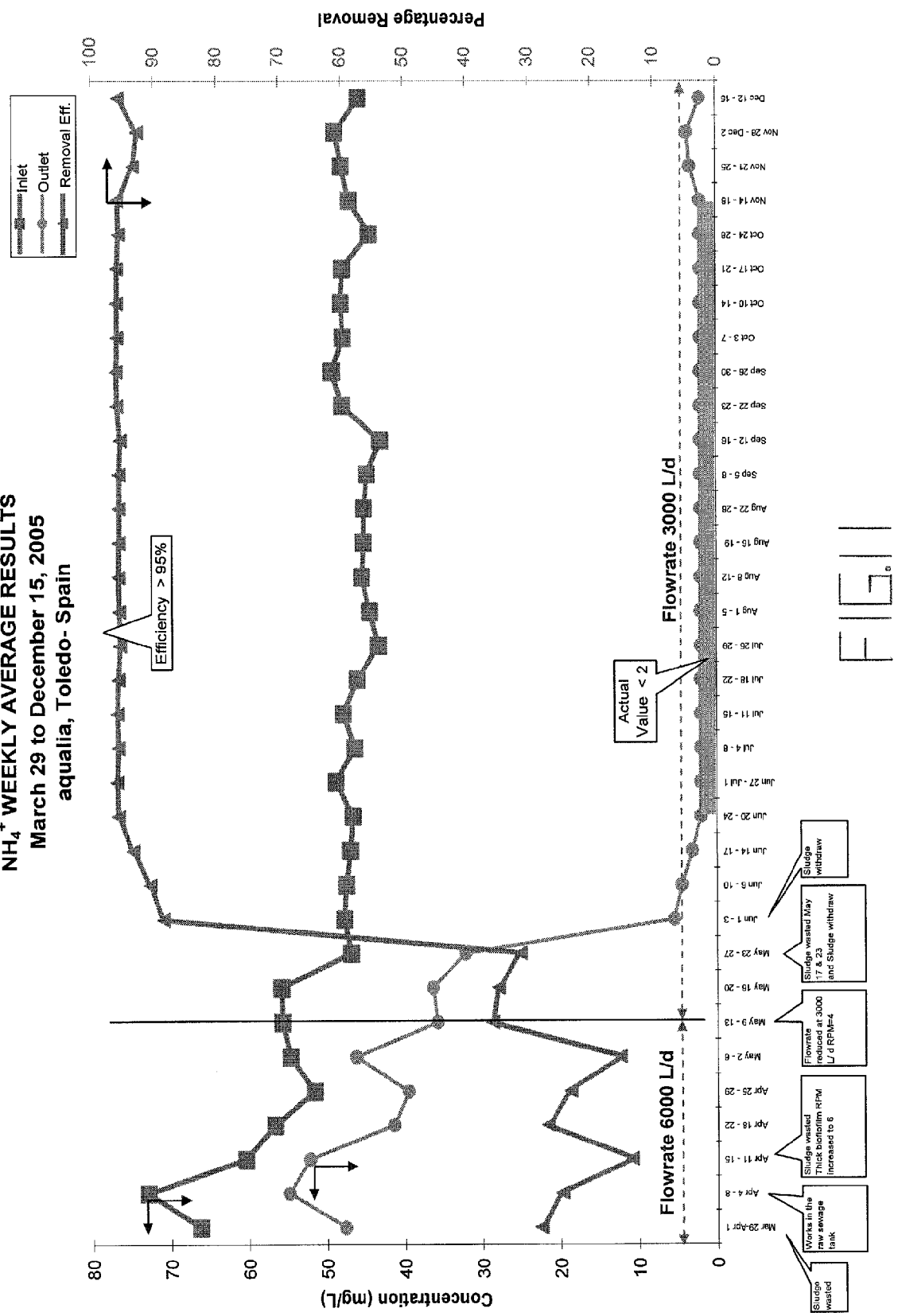
FIG. 11 is a graph of the ABC unit performance removing ammonia. The weekly removal efficiency with municipal wastewater (including leachate) in Toledo, Spain is shown for the period between March 2005 and December 2005.
Figure 12:
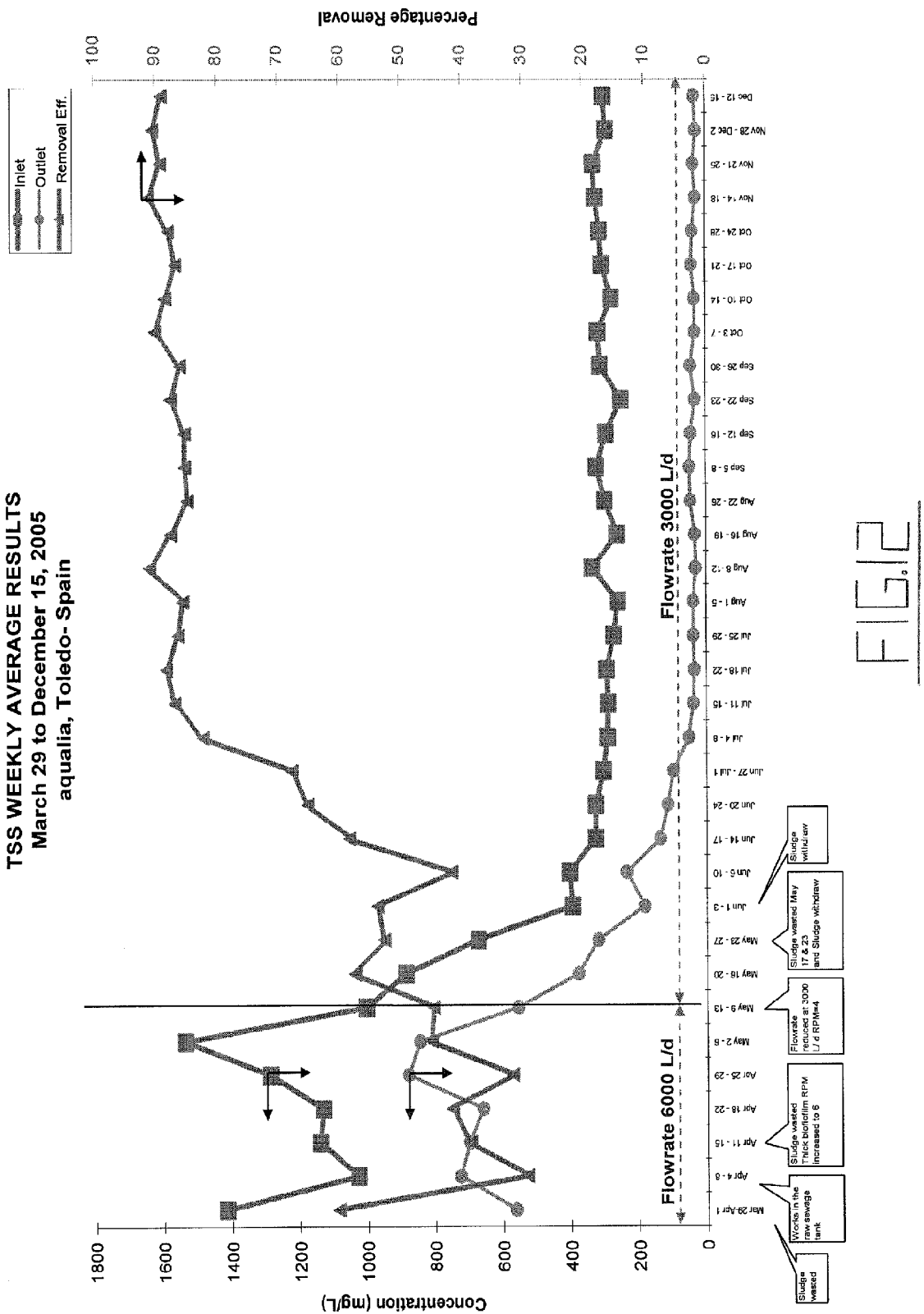
FIG. 12 is a graph of the ABC unit performance removing TSS. The weekly removal efficiency with municipal wastewater (including leachate) in Toledo, Spain is shown for the period between March 2005 and December 2005.

The ammonia removal of the ABC unit is remarkable. As shown in FIG. 11 the oxidation of ammonia was superior to a 95% once the biofilm was established at the end of May. The influent concentration of ammonia was two to three times higher than that found in typical domestic wastewater. The concentration in the effluent was less than 2 mg/L E. Total Suspended Solid Removal E. Total Suspended Solid Removal The ABC achieved a removal efficiency comparable to that obtained with winery wastewater (See Table 1 and Table 3) that is 88% removal. FIG. 12 shows the weekly average removal for the evaluation period.

Figure 8:
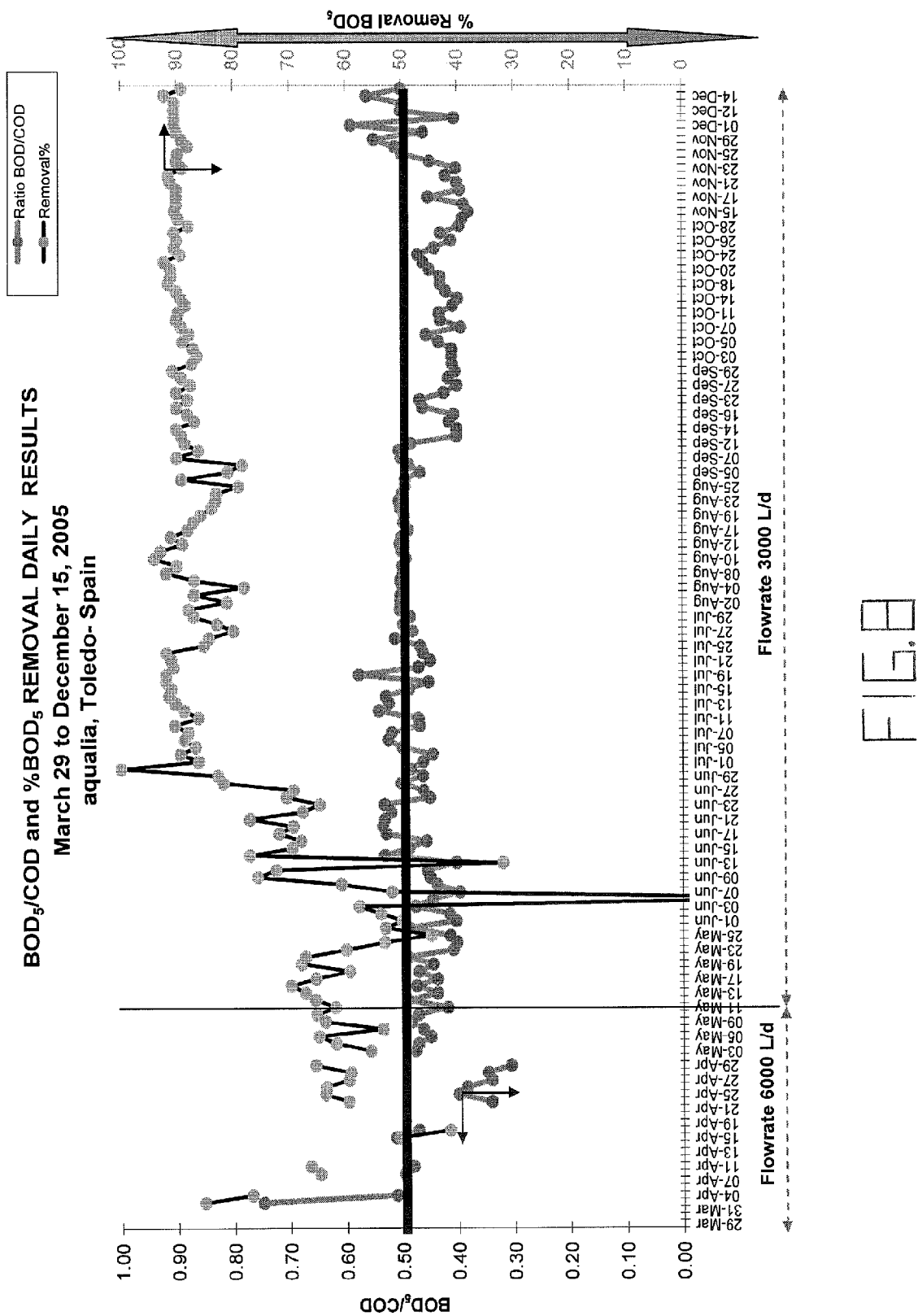
FIG. 8 is a graph of the ratio $BOD_5/COD$ as an indicator of the biodegradability of the municipal wastewater treated by the present unit in Toledo, Spain between March 2005 and December 2005. Low biodegradability is indicated by ratios lower than 0.5. A ratio of 0.3 indicates a wastewater difficult to treat and prone to produce toxic shocks and operational problems.
Figure 9:
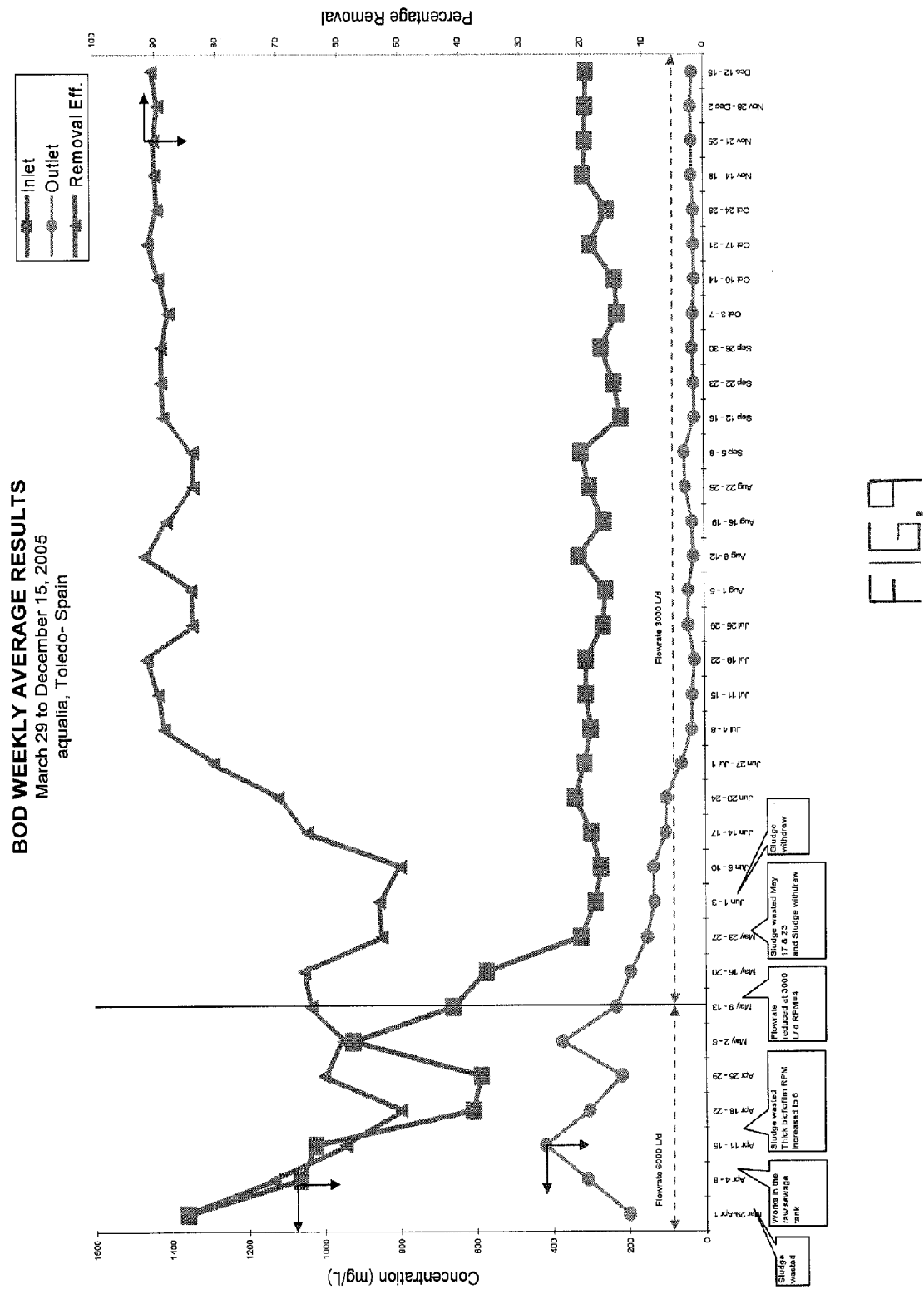
FIG. 9 is a graph of the ABC unit performance removing $BOD_5$. The weekly removal efficiency with municipal wastewater (including leachate) in Toledo, Spain is shown for the period between March 2005 and December 2005.

The difficult nature of the wastewater treated is reflected in FIG. 8 where a $BOD_5$/COD ratio lower than 0.4 is observed during most of the ten months lasting the evaluation. A ratio of 0.3 is an indication of a toxic shock and subsequent loss of biofilm. The unit recovered fast which is typical of fixed film technologies as opposed to suspended growth ones (Activated sludge) where the biomass takes much longer to build up.

A comparative performance of the AQUACAN™ unit with the performance of Municipal Plants in both the city of Toledo (Spain) and that of Niagara Falls (Canada) indicate that the unit exhibits performance parameters comparable or superior to that found in Municipal Plants. It is worth mentioning that the AQUACAN™ unit received pretreated effluent only as opposed to the primary effluent received by the plants in Toledo and Niagara Falls (Table 3).

Falls, Canada, and a Municipal Wastewater mixed with landfill leachate and septage in the city of Toledo, Spain, we can conclude the following:

1. The Active Biological Contactor (AQUACAN™) is a compact and modular wastewater treatment plant with treatment capacities of 3 m³/day, 6 m³/day, 15 m³/day, 30 m³/day and 50 m³/day. An individual module or unit comprises three bioreactors in series. Two of the bioreactors are based on the enhancement of oxygen mass transfer by microbubbles, and the third one is a high-performance rotating biological contactor endowed with discs of high surface area. Additional modules can be added to an ABC and not only biological but chemical coagulation can be exploited to achieve advanced phosphorous removal or denitrification in an anoxic bioreactor. This permits ABCs to be used in the treatment of both industrial and municipal wastewater.

2. The Active Biological Contactor can treat on a continuous basis high strength wastewater in the range 300-12000 mg/L of $BOD_5$ with an average removal efficiency of 96%. Furthermore, it produces effluent quality for immediate discharge to leaching beds as regulated by the Ontario Ministry of the Environment. Even superior effluent quality and treatment capacity can be achieved by using the modularity features of the technology.

3. The Active Biological Contactor (AQUACAN™) treats municipal wastewater mixed with landfill leachate and septage with 90% $BOD_5$ removal efficiency. Ammonia removal exceeds 95%.

4. By adding a polishing stage like an approved biofilter, and chemical coagulants the system can deliver tertiary effluent quality for discharge to surface water sources.

5. The treatment unit connected to a properly approved biofilter, and or ultraviolet disinfection can meet the regulatory requirements for the treatment of wastewater from domestic wastewater and food processors like wineries.

While the preferred embodiments of the invention have been described above, it will be recognized and understood that various modifications may be made therein, and the

TABLE 3

Performance comparison of the AQUACAN ® 6 with Secondary Treatment Bioreactors and Full Scale Municipal Plants.

| | % Removal | | | | |
|---|---|---|---|---|---|
| | AQUACAN ® | | Municipal plants | | |
| Parameters | MOE Technology Assessment (2004), Winery at Niagara Falls, Ontario (Industrial) (Canada) | Toledo (Spain) (2005) (Municipal wastewater) (Spain) | EDAR Toledo Municipal Plant (2006) (Spain) | EDAR Toledo Municipal Plant (2006) Trickling filters Performance (Spain) | Niagara Falls Municipal Plant (2004) RBC (Canada) |
| $CBOD_5$ | 96 | 89 | 95 | 85 | 91 |
| TSS | 87 | 88 | 94 | 75 | 90 |
| $NH_4$ | NA | 95 | 40 | NA | NA |
| TKN | 44 | NA | NA | NA | 27 |
| TP | 41 | NA | NA | NA | NA |

CONCLUSIONS

From the test programs to evaluate the performance of the ABC AQUACAN™ technology as described above treating winery wastewater from a commercial winery in Niagara appended claims are intended to cover all such modifications which may fall within the spirit and scope of the invention.

The invention claimed is:

1. A compact wastewater treatment plant comprising three or more bioreactors in series:

a first microbubble/settling chamber having a settling chamber to collect suspended solids in communication with a microbubble chamber with a plurality of diffusers for injecting microbubbles into wastewater:

a rotating biological contactor comprising a plurality of discs arranged for rotation about a shaft, said rotating biological contactor being in fluid connection with the first microbubble chamber; and a second microbubble/settling chamber having a settling chamber to collect suspended solids in communication with a microbubble chamber having a plurality of diffusers for injecting microbubbles in the wastewater, said second microbubble chamber being in fluid connection with the rotating biological contactor.

2. The unit according to claim 1 including additional chambers or chemical or biological reactors connected to the microbubble settling chambers.

3. The wastewater treatment unit according to claim 1 wherein the discs comprises a plurality of geometric cells.

4. The wastewater treatment unit according to claim 3 wherein the cells have a hexagonal shape.

5. The wastewater treatment unit according to claim 3 wherein the cells have an octagonal shape.

6. A method of treating wastewater comprising:

flowing a quantity of a wastewater into a first microbubble/settling chamber, said microbubble/settling chamber having a settling chamber to collect suspended solids in communication with a microbubble chamber having a plurality of diffusers for injecting microbubbles into the wastewater, thereby promoting oxygenation of the wastewater; said microbubble/settling chamber further including activated sludge for treating the wastewater;

flowing the wastewater form the first microbubble/settling chamber through a plurality of rotating discs, said discs having a biofilm of microorganisms mounted thereon; said discs rotating about a shaft such that a portion of each disc is exposed to aid during rotation;

flowing the wastewater into a second microbubble/settling chamber, said microbubble/settling chamber having a settling chamber to collect suspended solids in communication with a microbubble chamber having a plurality of diffusers for injecting microbubbles into the wastewater; and recovering the treated wastewater.

7. The method according to claim 6 wherein the discs comprise a plurality of geometric cells.

8. The method according to claim 7 wherein the cells have a hexagonal shape.

9. The method according to claim 7 wherein the cells have an octagonal shape.

10. The method according to claim 6 wherein the discs are interlocked such that warping of the discs is prevented.

11. The method according to claim 6 wherein the shaft is enclosed within a sleeve which prevents corrosion due to the exposure of the shaft to the wastewater.

12. The method according to claim 6 including connecting two or more chemical and/or biological reactors and an RBC.

* * * * *